(12) United States Patent
Asgar Pour Khezer Abad et al.

(10) Patent No.: US 10,808,801 B2
(45) Date of Patent: Oct. 20, 2020

(54) BUSH AND ASSOCIATED BUSH CHAIN

(71) Applicant: Schaeffler Technologies AG & Co. KG, Herzogenaurach (DE)

(72) Inventors: Monir Asgar Pour Khezer Abad, Rinxent (FR); Christian Poiret, Coulogne (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 346 days.

(21) Appl. No.: 15/753,240

(22) PCT Filed: Aug. 30, 2016

(86) PCT No.: PCT/DE2016/200404
§ 371 (c)(1),
(2) Date: Feb. 16, 2018

(87) PCT Pub. No.: WO2017/041797
PCT Pub. Date: Mar. 16, 2017

(65) Prior Publication Data
US 2018/0245667 A1    Aug. 30, 2018

(30) Foreign Application Priority Data
Sep. 11, 2015    (DE) ................. 10 2015 217 411

(51) Int. Cl.
*F16G 13/06* (2006.01)
*F16C 17/02* (2006.01)

(52) U.S. Cl.
CPC .............. *F16G 13/06* (2013.01); *F16C 17/02* (2013.01); *F16C 2361/71* (2013.01)

(58) Field of Classification Search
CPC .......... F16G 13/06; F16G 13/10; F16C 17/02; F16C 2361/71
See application file for complete search history.

(56) References Cited

U.S. PATENT DOCUMENTS

| | | | |
|---|---|---|---|
| 1,945,357 | A | 1/1934 | Pierce |
| 4,603,459 | A | 8/1986 | Buchanan |
| 5,176,587 | A | 1/1993 | Mott |
| 5,829,850 | A | 11/1998 | Ketting et al. |
| 6,330,788 | B1 | 12/2001 | Winklhofer |
| 2010/0035714 | A1 | 2/2010 | Sandro et al. |
| 2014/0171246 | A1 | 6/2014 | Ritz |
| 2015/0211603 | A1 | 6/2015 | Koschig et al. |
| 2018/0031075 | A1* | 2/2018 | Tanaka .................. F16G 13/06 |

FOREIGN PATENT DOCUMENTS

| | | |
|---|---|---|
| AT | 137238 | 4/1934 |
| CN | 103867645 | 6/2014 |
| DE | 3238368 | 8/1984 |
| DE | 4328701 | 3/1995 |
| DE | 102013212486 | 12/2014 |

(Continued)

*Primary Examiner* — Michael R Mansen
*Assistant Examiner* — Robert T Reese
(74) *Attorney, Agent, or Firm* — Volpe Koenig

(57) ABSTRACT

A bush (1, 19) for a bush chain (15), the inner surface (4) of which bush has a friction surface for a pin (12), wherein the inner surface (4) has two sections (4, 5, 21, 22), which lie opposite each other and extend in the longitudinal direction of the bush (1, 19) and are asymmetrically curved.

16 Claims, 3 Drawing Sheets

(56) References Cited

FOREIGN PATENT DOCUMENTS

| | | |
|---|---|---|
| EP | 1069344 | 1/2001 |
| EP | 1070873 | 1/2001 |
| GB | 409432 | 5/1934 |
| GB | 2128712 | 5/1984 |
| JP | 2000218446 | 8/2000 |
| WO | 2005043005 | 5/2005 |

* cited by examiner

BUSH AND ASSOCIATED BUSH CHAIN

BACKGROUND

The invention relates to a bush for a bush roller chain, whose inner surface has a friction surface for a bolt.

The invention also relates to a bush roller chain, comprising a plurality of alternately arranged, interconnected, and pin-jointed inner and outer chain elements, wherein each inner chain element comprises two inner links that are spaced apart from each other and are interconnected by two pins, wherein each pin is surrounded by a bush.

Such bushes and bush roller chains are used, e.g., in a chain drive of an internal combustion engine, and connect a crankshaft gear to a camshaft gear.

A bush according to the class and an associated bush roller chain are known from DE 10 2013 212 486 A1.

The design of a bush for a bush roller chain has a large effect on the wear and fatigue behavior. Particular importance is placed on the inner profile, that is, the inner surface of a bush. The inner surface of the bush comprises a contact surface between the bush and a pin. The size and shape of this contact surface are directly dependent on the profile of the bush. On the other hand, deformation (bending) of the pin during operation also depends on the profile, that is, the shape of the inner surface of the bush that is used as the friction surface. Depending on the selected profile and thus depending on the shape and geometry of the bush, the lubrication of the friction surface on the inside of the bush and the outside of the pin increases or decreases. The type of lubrication directly influences the wear of the bush roller chain. On the other hand, the stiffness of a bush roller chain also depends on the profile of the inner surface of the individual bushes. For bush roller chains whose bushes are in contact with a pin, only one side of the bush wears during operation, whereas the other side is not in contact with the pin.

SUMMARY

The invention is based on the objective of providing a bush for a bush roller chain that is optimized with respect to low wear.

To achieve this objective, for a bush of the type specified above, it is provided according to the invention that the inner surface has two opposing, asymmetrically curved sections extending in the longitudinal direction of the bush.

The invention uses the knowledge that the wear behavior can be optimized by the asymmetrical profile of the bush provided according to the invention. In contrast, conventional bushes for bush roller chains are constructed as hollow cylinders. The term "asymmetrical" is to be understood here such that there is asymmetry in at least one cross-sectional plane, while a cross section along a different plane can be symmetrical.

The two spaced-apart, asymmetrical, and preferably convexly curved sections produce the advantage that, on one hand, the load-bearing properties of the bush and, on the other hand, the lubrication, are improved. Bush roller chains are usually lubricated by a lubricant such as oil. The special design of the bush significantly improves the lubrication of the friction surface between the bush and pin, which optimizes the wear behavior in the desired way.

A preferred design of the bush according to the invention provides that the first curved section has a larger radius of curvature than the second curved section. This produces the advantage that one curved section can be optimally designed with respect to a favorable wear behavior and the other curved section can be designed with respect to a favorable bending behavior. Thus, on one hand, the bending of the bush and/or the pin connected to the bush can be positively influenced, and, on the other hand, an adequate supply of lubricant to the bush, especially its inner friction surface, is guaranteed by the selection of a suitable radius of curvature.

One refinement of the bush according to the invention provides that the friction surface has two opposing cylindrical sections that are arranged in the circumferential direction between the convexly curved sections. According to this, viewed in the circumferential direction, each convexly curved section is surrounded on both sides by a cylindrical section, that is, the cylindrical sections and the convexly curved sections alternate in the circumferential direction.

One especially favorable design provides that the bush has a symmetrical design relative to a center plane dividing the bush in the longitudinal direction. This center plane divides the two convexly curved sections. The bush accordingly has a mirror-symmetric design with respect to the center plane, which produces the advantage that the alignment of the bush does not need to be observed during installation.

Alternatively, and also additionally, for the bush according to the invention it is provided that it has a symmetrical design with respect to a center plane dividing the bush in the transverse direction. The center plane is simultaneously a mirror plane for the bush that is mirror symmetric with respect to the center plane.

Preferably, the curved sections of the bush according to the invention extend across its entire length, that is, the friction surface used as the inner surface has a continuous profile in the longitudinal direction. The invention also relates to the already mentioned bush roller chain comprising a plurality of alternately arranged, interconnected, pin-jointed inner and outer chain elements, wherein each chain element comprises two inner links that are spaced apart from each other and are connected to each other by two pins, wherein each pin is surrounded by a bush of the described type.

For the bush roller chain according to the invention, it is preferred that the curved sections of the bush are shaped so that they allow only a limited relative rotation between the bush and pin. This is caused by the profile of the bush, which is shaped accordingly for this purpose. The pins of the bush roller chain can have both a cylindrical and also a non-cylindrical cross section.

BRIEF DESCRIPTION OF THE DRAWINGS

The invention will be explained below using embodiments with reference to the drawings. The drawings are schematic representations and show.

DETAILED DESCRIPTION

Figure 1:
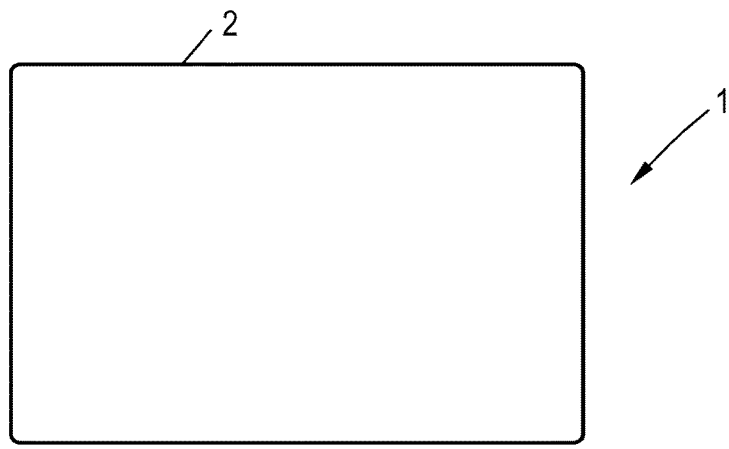
FIG. 1 a side view of a bush according to the invention.

FIG. 1 shows a bush 1 in a side view. The bush 1 consists of a steel alloy and has a cylindrical outer surface 2.

Figure 2:
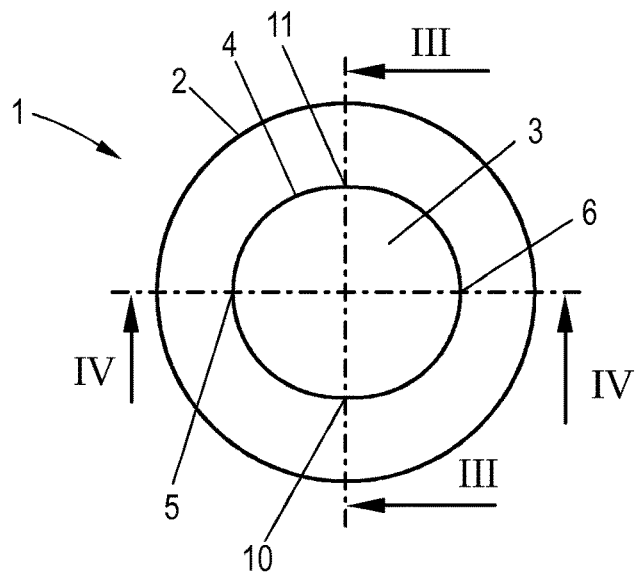
FIG. 2 an axial view of the bush according to the invention from FIG. 1.
Figure 3:
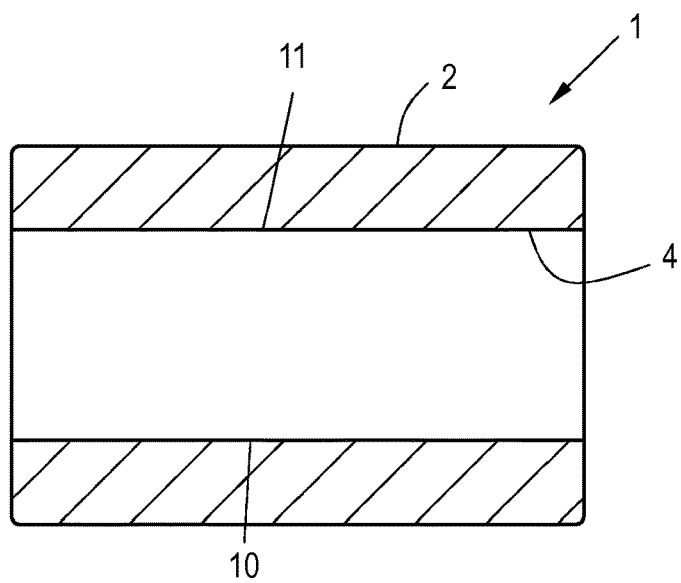
FIG. 3 a section along the line III-III from FIG. 2.
Figure 4:
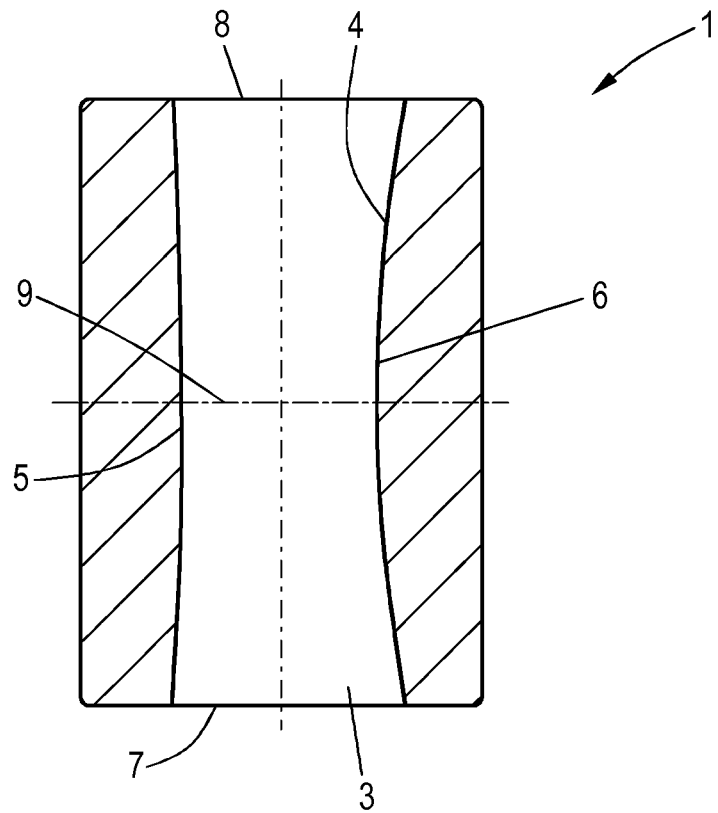
FIG. 4 a section along the line IV-IV from FIG. 2.

In the axial view of FIG. 2, it can be seen that the bush 1 has an opening 3 that penetrates the bush 1 in the longitudinal direction, so that the opening 3 forms a passage hole. The bush 1 shown in FIG. 2 is also described with reference to FIGS. 3 and 4, wherein FIG. 3 shows a section along the line III-III and FIG. 4 shows a section along the line IV-IV. In FIGS. 2 and 4, it can be seen that the opening 3 has a non-cylindrical shape. The opening 3 is limited by an inner surface 4 of the bush 1 that forms a friction surface for a pin. The friction surface has two opposing, convexly curved sections 5, 6 extending in the longitudinal direction of the bush 1. These sections 5, 6 are curved so that the bush 1 has a larger internal diameter at its axial ends 7, 8 than in the middle area. In FIG. 4 it can be seen that the curved sections 5, 6 extend across the entire length of the bush 1. It can be further seen that the bush 1 is symmetric with respect to a center plane 9 dividing this bush in the transverse direction. The convexly curved section 6 is optimized with respect to the bending of the bush 1 and the convexly curved section 5 is optimized with respect to a good wear behavior.

Viewed in the circumferential direction, cylindrical sections 10, 11 connect to the two curved sections 5, 6, so that a convexly curved section and a cylindrical section are in an alternating arrangement.

Figure 5:
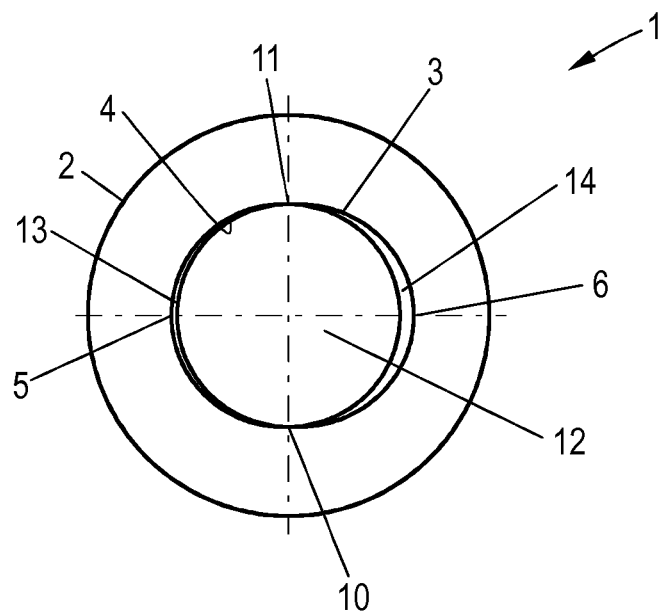
FIG. 5 the bush shown in FIG. 2 with a pin.

FIG. 5 is a similar view in the axial direction as FIG. 2, wherein a pin 12 arranged in the interior of the bush 1 is also shown. The pin 12 passes through the opening 3, it has a greater length than the bush 1, and projects past the bush 1 on both axial ends 7, 8. The pin 12 is connected at both ends to inner links (not shown).

In FIG. 5 it can be seen that a clearance 13 is formed between the outer surface of the pin 12 and the convexly curved section 5 and a clearance 14 is formed between the outer surface of the pin 12 and the convexly curved section 6. Because the first curved section 5 has a larger radius of curvature than the second convexly curved section 6, the surface area of the clearance 13 is smaller in comparison to the opposing clearance 14. The two clearances 13, 14 are largest in the area of the ends 7, 8 of the bush 1; they decrease from the outside toward the inside up to the center plane 9.

Figure 6:
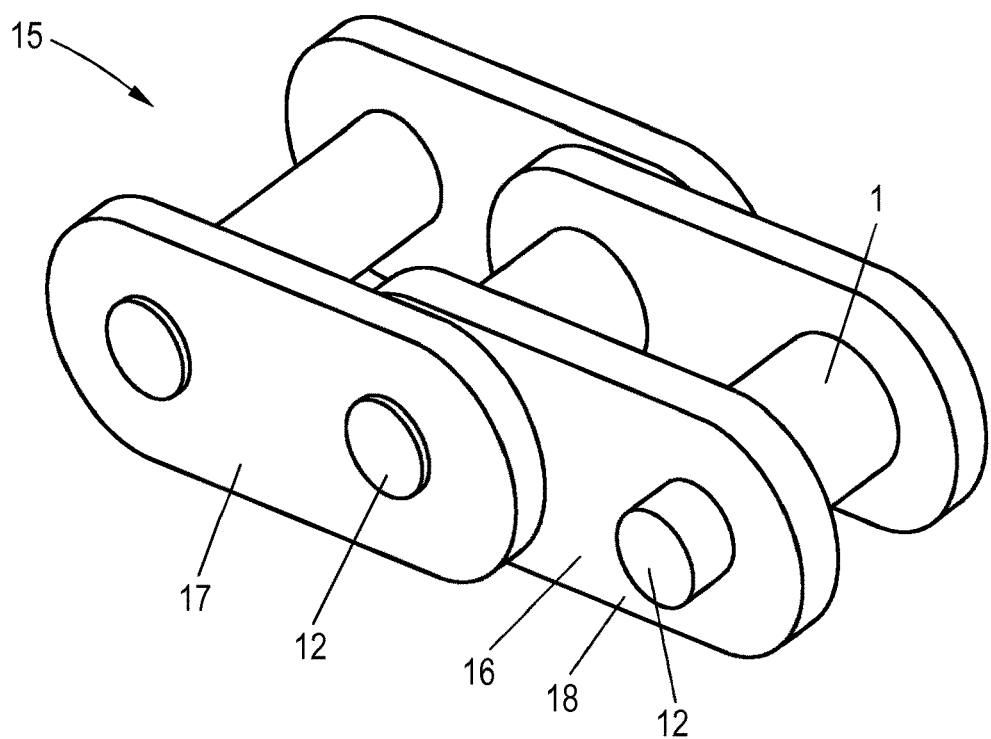
FIG. 6 a segment of a bush roller chain according to the invention in a perspective view.

FIG. 6 shows a segment of a bush roller chain 15 comprising a plurality of alternately arranged, interconnected, and pin-jointed inner chain elements 16 and outer chain elements 17, wherein each inner chain element 16 has two inner links 18 that are spaced apart from each other and are connected to each other by two pins 12, wherein each pin 12 is surrounded by a bush 1. The bushes 1 are press-fitted to the inner links 18. The pins 12 are press-fitted to the outer chain elements 17, so that relative movement between the bushes 1 and the pins 12 is possible. For the bush roller chain 15, the convexly curved sections 5, 6 of the bush 1 are shaped so that they allow only limited relative rotation between the bush 1 and the pin 12. The pin 12 and bush 1 are arranged so that force is transmitted only on the friction surface that is formed between the convexly curved section 5 and the outer side of the pin 12. The clearance 13 formed at this location is therefore smaller than the opposing clearance 14 that allows and simplifies wetting with a lubricant such as oil, so that the wear behavior of the bush 1 and thus of the entire bush roller chain 15 is favorably influenced.

Figure 7:
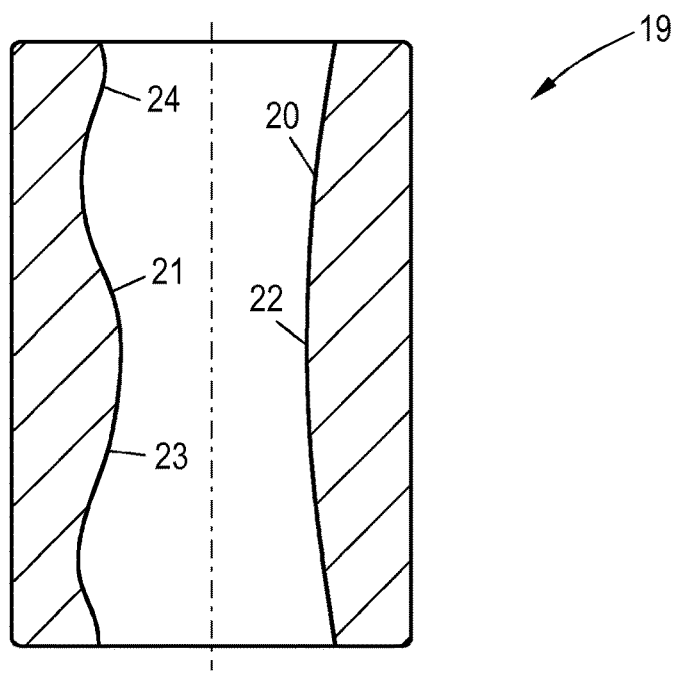
FIG. 7 another embodiment of a bush according to the invention in a sectioned view.

FIG. 7 shows another embodiment of a bush 19 in a sectioned view. Similar to the bush 1 shown in FIG. 4, an inner surface 20 of the bush 19 comprises two opposing, asymmetrically curved sections 21, 22 extending in the longitudinal direction of the bush 19. The convexly curved section 22 corresponds in principle to the section 6 shown in FIG. 4; its shape is selected with respect to an optimal bending behavior. The opposing section 21 is not only convexly curved, but instead has a wave-shaped form and thus comprises multiple, alternating convex and concave sections. In the illustrated embodiment, the section 21 has two projections 23, 24 that extend radially inward and are optimized with respect to the wear behavior. The embodiment of FIG. 7 is not to be understood as a limitation, because, in particular, the section 21 can also be modified, for example, three such projections 23, 24 can also be provided or the length and the radial extend of a projection can be adapted and modified with respect to certain requirements and boundary conditions.

LIST OF REFERENCE SYMBOLS

1 Bush
2 Outer surface
3 Recess
4 Inner surface
5 Section
6 Section
7 End
8 End
9 Center plane
10 Section
11 Section
12 Pin
13 Clearance
14 Clearance
15 Bush roller chain
16 Inner chain element
17 Outer chain element
18 Inner link
19 Bush
20 Inner surface
21 Section
22 Section
23 Projection
24 Projection

The invention claimed is:

1. A bush for a bush roller chain, comprising an inner surface that forms a friction surface for a pin, the inner surface has opposing first and second sections that extend in a longitudinal direction of the bush and are curved asymmetrically relative to each other, the first and second sections are curved convexly towards each other.

2. The bush according to claim 1, wherein the first curved section has a larger radius of curvature than the second curved section.

3. The bush according to claim 1, wherein the friction surface further comprises two opposing cylindrical sections that are arranged between the first and second curved sections in a circumferential direction.

4. The bush according to claim 1, wherein the bush is symmetrical with respect to a center plane dividing the bush in the longitudinal direction.

5. The bush according to claim 1, wherein the bush is symmetrical with respect to a center plane dividing the bush in a transverse direction.

6. The bush according to claim 1, wherein the curved sections extend across an entire length of the bush.

7. A bush roller chain, comprising a plurality of alternately arranged, interconnected, and pin-jointed inner and outer chain elements, each said inner chain element comprises two inner links that are spaced apart from each other and are interconnected by two pins, and each said pin is surrounded by a bush according to claim 1.

8. The bush roller chain according to claim 7, wherein the curved sections of the bush are shaped to allow only a limited relative rotation between the bush and the pin.

9. The bush according to claim 1, wherein the first section includes a single convex projection and the second section has a wave-shaped profile including more than one convex projection.

10. A bush, comprising a body having a through hole that defines an inner surface that forms a friction surface for a pin, the inner surface including opposing first and second curved sections that are asymmetric to one another and extend in a longitudinal direction of the hole that are connected by two additional opposing sections.

11. The bush according to claim 10, wherein the first curved section has a larger radius of curvature than the second curved section.

12. The bush according to claim 11, wherein the first and second curved sections are convexly curved such that a cross-sectional area of the hole at a medial location is smaller than at longitudinal ends of the hole.

13. A bush roller chain, comprising a plurality of alternately arranged, interconnected, and pin-jointed inner and outer chain elements, said inner chain elements each comprising two spaced apart inner links interconnected by two bushes, and said outer chain elements each comprising two spaced apart outer links interconnected by pins that extend through the bushes of neighboring inner chain elements that are spaced apart by one of the outer chain elements, the bushes each including a body having a through hole that defines an inner surface that forms a friction surface for the pin, the inner surface including opposing first and second curved sections that are asymmetric to one another and extend in a longitudinal direction of the hole that are connected by two additional opposing sections.

14. The bush roller chain according to claim 13, wherein the first curved section has a larger radius of curvature than the second curved section.

15. The bush roller chain according to claim 14, wherein the first and second curved sections are convexly curved such that a cross-sectional area of the hole at a medial location is smaller than at longitudinal ends of the hole.

16. The bush roller chain according to claim 13, wherein the curved sections of the bush are shaped to allow only a limited relative rotation between the bush and the pin.

* * * * *